(12) United States Patent
Ansoldi et al.

(10) Patent No.: US 10,584,394 B2
(45) Date of Patent: Mar. 10, 2020

(54) APPARATUS TO MOVE AND PREHEAT METAL MATERIAL

(71) Applicant: DANIELI & C. OFFICINE MECCANICHE SPA, Buttrio (IT)

(72) Inventors: Marco Ansoldi, Udine (IT); Yuri Raffaglio, Tavagnacco (IT); Daniele Petrei, Corno di Rosazzo (IT)

(73) Assignee: DANIELI & C. OFFICINE MECCANICHE SPA, Buttrio (IT)

( * ) Notice: Subject to any disclaimer, the term of this patent is extended or adjusted under 35 U.S.C. 154(b) by 101 days.

(21) Appl. No.: 15/314,816

(22) PCT Filed: May 29, 2015

(86) PCT No.: PCT/IB2015/054048
§ 371 (c)(1),
(2) Date: Nov. 29, 2016

(87) PCT Pub. No.: WO2015/181781
PCT Pub. Date: Dec. 3, 2015

(65) Prior Publication Data
US 2017/0121781 A1 May 4, 2017

(30) Foreign Application Priority Data
May 30, 2014 (IT) .............................. UD2014A0092

(51) Int. Cl.
*C21C 5/56* (2006.01)
*F27D 13/00* (2006.01)
(Continued)

(52) U.S. Cl.
CPC ................ *C21C 5/565* (2013.01); *F27B 5/12* (2013.01); *F27B 14/0806* (2013.01);
(Continued)

(58) Field of Classification Search
CPC ....... C21C 5/565; F27D 13/00; F27D 13/002; F27D 17/002; F27B 2014/085; F27B 14/0806
See application file for complete search history.

(56) References Cited

U.S. PATENT DOCUMENTS 2,343,337 A * 3/1944 Somes .................... F27B 3/085
266/248
2,737,858 A * 3/1956 Simpson ................. B28B 1/522
162/297
(Continued)

FOREIGN PATENT DOCUMENTS

CN 201662331 12/2010
EP 0420776 4/1991
(Continued)

OTHER PUBLICATIONS

International Search Report, issued in the corresponding international PCT application No. PCT/IB2015/054048, dated Sep. 9, 2015, 3 pages.

*Primary Examiner* — Steven S Anderson, II
(74) *Attorney, Agent, or Firm* — Hamre, Schumann, Mueller & Larson, P.C.

(57) ABSTRACT

An apparatus to move and preheat metal material (M) to be fed to a container comprises a containing structure, having an internal compartment and provided with a support wall, a conveyor for the material (M), a fume transit section whose volume reduces as it is distanced from said container along the longitudinal development of said containing structure, and a collector for hot fumes (F) whose volume increases in a manner correlated to said reduction in the fume transit section. The collector is located below said conveyor inside the internal compartment essentially along the entire longitudinal development of said containing structure. Moreover, one or more through apertures are made in said support wall to put the conveyor and the collector into fluidic connection.

11 Claims, 2 Drawing Sheets

(51) Int. Cl.
  *F27D 17/00*    (2006.01)
  *F27B 14/08*    (2006.01)
  *F27B 5/12*     (2006.01)
(52) U.S. Cl.
  CPC ......... *F27D 13/002* (2013.01); *F27D 17/002* (2013.01); *F27B 2014/085* (2013.01); *Y02P 10/216* (2015.11)

(56) References Cited

U.S. PATENT DOCUMENTS

| | | | | |
|---|---|---|---|---|
| 5,316,270 A * | 5/1994 | Hamy | ................. | C21C 5/565 266/159 |
| 5,748,479 A * | 5/1998 | Weber | ................. | C03C 25/70 700/112 |
| 2013/0153368 A1* | 6/2013 | Tsuge | ................. | C21B 13/0053 198/752.1 |
| 2015/0211797 A1* | 7/2015 | Miani | ................. | C21C 5/565 373/80 |
| 2016/0003542 A1* | 1/2016 | Huang | ................. | C21C 5/527 373/80 |

FOREIGN PATENT DOCUMENTS

| | | |
|---|---|---|
| EP | 2546593 | 1/2013 |
| WO | 2011091685 | 8/2011 |

* cited by examiner

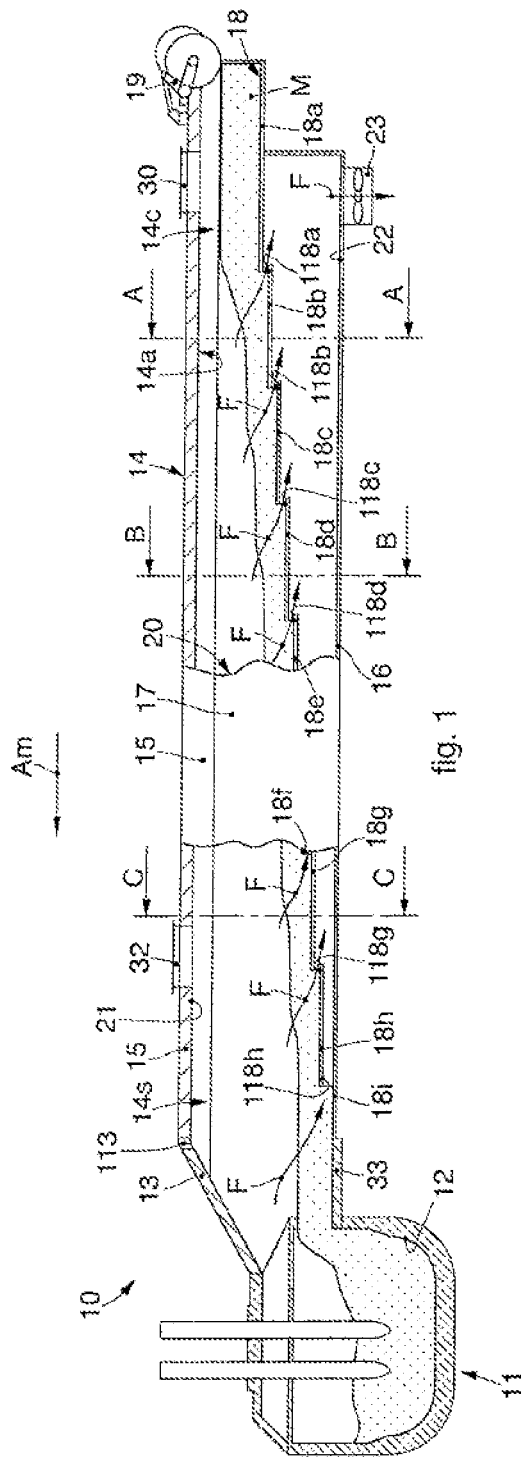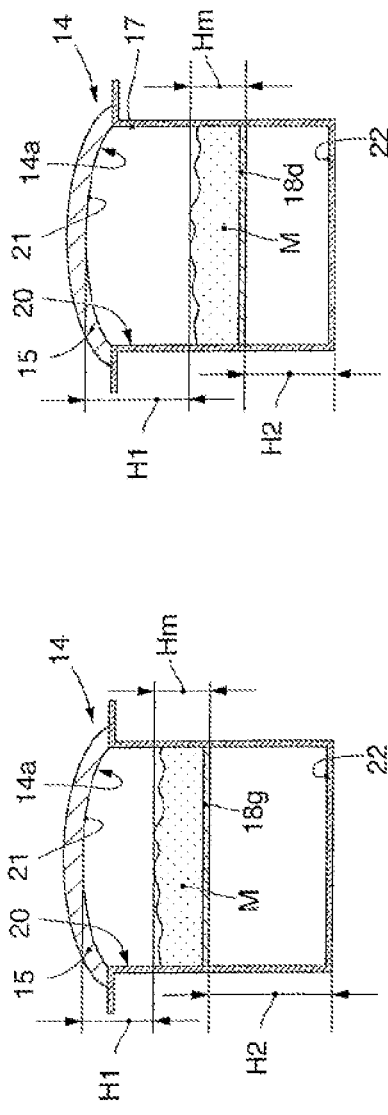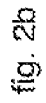

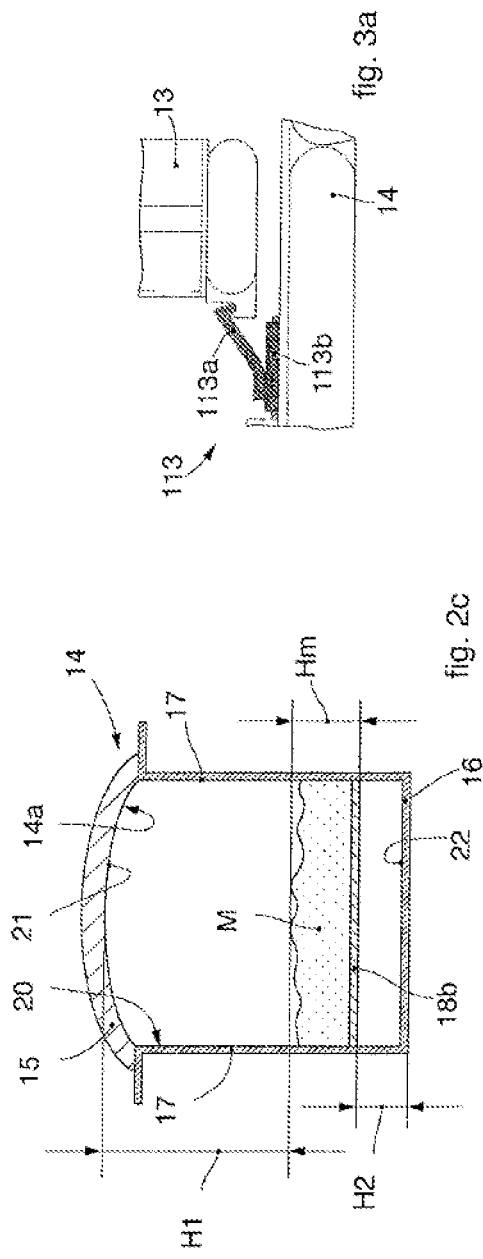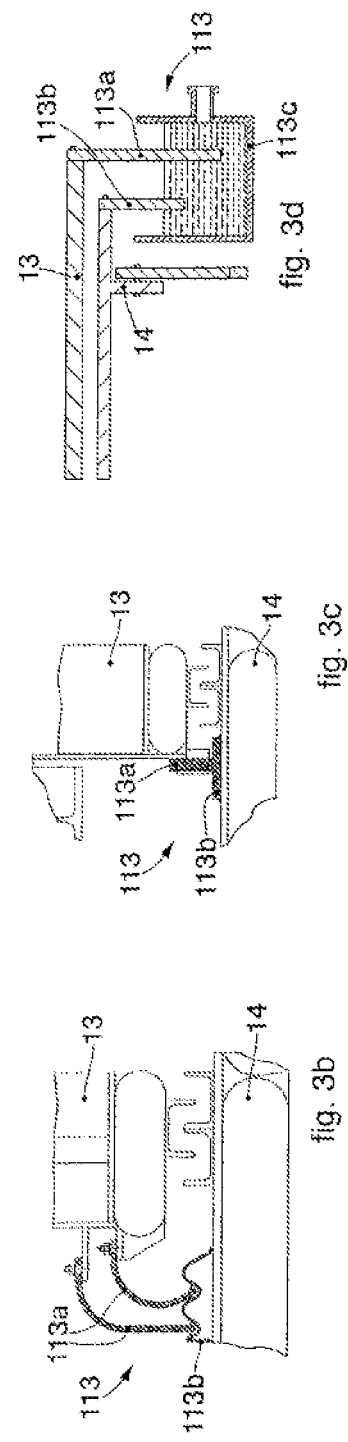

APPARATUS TO MOVE AND PREHEAT METAL MATERIAL

FIELD OF THE INVENTION

The present invention concerns an apparatus usable in the metallurgical and/or steel-making field to move and preheat metal material to be transported toward a container.

The apparatus according to the present invention is configured to allow to heat the metal material by hot fumes arriving for example from a melting furnace to which the apparatus can be associated, and to convey it toward a container, which can be a scrap-carrier basket for the discontinuous or "batched" charging of the melting furnace, or a shell of the melting furnace, in a direct, for example continuous, charge.

BACKGROUND OF THE INVENTION

In the metallurgical field, it is known to use vibrating or mobile conveyors with the function of conveying metal material toward a temporary storage container or a melting furnace.

The metal material can be scrap iron, hot or cold sponge iron (DRI—Direct Reduction Iron), cold cast iron in bricks or briquettes, or other metal material, and can be conveyed to a containing basket in a discontinuous or batched charging process, or to the shell of the melting furnace, in a continuous charging process.

It is also known to use apparatuses that have both the function of moving, for example by means of a conveyor, the metal material to be used for charging the melting furnace, and also the function of preheating the material, exploiting the heat contained in the fumes produced by the melting process and suitably channeled inside the conveyor. This gives a reduction in the quantity of energy needed to melt the metal material during the subsequent melting steps.

Apparatuses are known for moving and preheating metal material that comprise a conveyor provided with an oblong bearing structure, substantially horizontal and which can even be several dozen meters long. A conveyor channel is mounted on the bearing structure and has lateral containing walls on which the metal material is deposited.

A vibration device is generally associated with the bearing structure, able to impart on the bearing structure a vibrational or oscillatory motion which determines the feed of the metal material in a longitudinal direction along the conveyor channel and toward the intended container.

At least a part of the bearing structure is covered at the upper part by one or more hoods that define a closed tunnel of which, in some solutions, the conveyor channel constitutes the lower part. Inside the tunnel the hot fumes exiting from the melting furnace are made to flow, to preheat the metal material present in the conveyor channel.

One disadvantage of known movement and preheating apparatuses is that they do not sufficiently exploit the great heat contained in the fumes, and are able to heat adequately only a part of the metal material, in particular the upper part, that is, the part directly hit by the stream of fumes.

Although such apparatuses, in fact, are able to introduce at a relatively high temperature, in the order of 1300-1400° C., a large quantity of fumes inside the tunnel of which the conveyor channel is part, they are able to adequately heat only a layer equal to about 20%-30% of the total height of the metal material, which is usually about 700-1200 mm.

One disadvantageous consequence of this is connected to the fact that the metal material exits from the conveyor channel at a relatively low mean temperature to allow an effective energy saving, and also with a stratified heat development, which is not uniform and not controlled, and which can therefore cause local melting and sticking of the metal material.

Another disadvantage of known apparatuses is that they are not able to adequately exploit the heat of the fumes, which exit from the preheating tunnel at a temperature that is still quite high, that is, about 1000° C., with consequent disadvantages in terms of complications of the plant and increased process costs linked to the need to cool the fumes exiting from the preheating tunnel before they are expelled into the atmosphere.

To promote the spread of the fumes over the whole height of the metal material, some solutions provide that, in the lower part of the lateral walls of the conveyor channel, suction means are disposed that suck in a part of the fumes laterally, obliging them to pass from the top downward through the metal charge. The fumes sucked in laterally then converge in a main fume discharge pipe.

One disadvantage of this type of known apparatuses is that they are voluminous and bulky, particularly in width, with a consequent high overall weight also due to the mass of cooling liquid needed to cool the walls of the tunnel.

In the state of the art, document EP-A1-420.776 is known, which describes a device for loading scrap for a furnace, having a support plane inclined from the top downward in the direction of the roof of the furnace.

In this solution, the scrap is moved toward the furnace by means of a vibration applied to the support plane which, together with gravity, causes the scrap to descend and enter through an aperture made in the upper roof of the furnace.

After passing through the scrap and giving up to it a part of their heat, the hot fumes exiting from the furnace are sucked in through suction means disposed laterally with respect to the support plane.

Documents EP-A1-2.546.593, CN-A-201662331 and WO-A1-2011091685 illustrate other systems for loading scrap with a horizontal or inclined support plane.

One purpose of the present invention is to obtain an apparatus for moving metal material, for example intended to be subsequently melted in a melting furnace, and for preheating the material, which is able to efficiently exploit the heat of the fumes produced by the melting process in the melting furnace and which is able to take from the fumes a high quantity of heat in order to heat the metal material to a higher temperature than that which can be reached with known apparatuses.

A connected purpose is to improve the distribution of the hot fumes on the entire mass of the metal material present in the conveyor channel.

Another purpose of the present invention is to obtain an apparatus to move and preheat metal material intended to be melted in a melting furnace which has reduced overall weight and bulk compared to known apparatuses.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus according to the present invention, to move and preheat metal material to be fed to a container, comprises a containing structure with a mainly horizontal development and having an upper wall, a base wall and lateral walls defining an internal compartment. The containing structure comprises a support wall, interposed between the upper wall and the base wall, a conveyor for the material, defined by the support wall, the lateral walls, the upper wall and the base wall, a fume transit section, defined between the upper wall and the material, and a collector for hot fumes.

In some forms of embodiment of the invention, the containing structure defines overall a rigid structure that develops substantially horizontally, and closed on all sides, inside which the internal compartment, collector and fume transit section are made.

The movement of the metal material toward the furnace is obtained by generating asymmetrical and alternate horizontal oscillations in opposite directions on the conveyor, thus determining alternate movements toward/away from the furnace. Such movements determine a progressive advance, in a horizontal direction, of the metal material toward the furnace.

In particular, one solution of the invention provides that the conveyor has its terminal end associated with a lateral door of the furnace, to determine the lateral entrance of the metal material through the lateral door.

According to some aspects of the present invention, the collector is located below the conveyor inside the internal compartment substantially along the entire longitudinal development of the containing structure, and one or more through apertures are made in the support wall to put the conveyor and the collector into fluidic connection. The suction of the fumes, in one solution of the invention, occurs from the end of the conveyor opposite the end associated with the furnace, so that the fumes are forced to assume a substantially rectilinear development in counterflow with respect to the direction of feed of the scrap, which affects the whole volume occupied by the scrap inside the conveyor.

The suction of the fumes, at the front of the furnace and not lateral as happens in the state of the art, reduces the bulk occupied by the conveyor and optimizes the heat exchange conditions between the hot fumes and the metal material to be heated.

In one solution of the invention, the volume of the fume transit section reduces as it is distanced from the container along the longitudinal development of the containing structure, and the volume of the collector increases in a manner correlated to the reduction in the fume transit section.

This solution advantageously allows to reduce the bulk of the apparatus according to the present invention compared with known apparatuses, in which the fumes are sucked in through a collector disposed laterally to the conveyor.

Furthermore, the present invention allows the advantage of preventing the heat stratification of the metal material, exploiting the energy content of the fumes with greater efficiency.

The correlated variation between the volumes of the fume transit section and the collector allows to keep at a high temperature the part of the hot fumes that transit in the conveyor in contact with the metal material, consequently allowing to heat the material more, compared with what is possible in the state of the art.

In some forms of embodiment, wherein the containing structure is provided with a loading zone for loading material into the internal compartment and an unloading zone for unloading the material into the container, the support wall has a development declining from the loading zone to the unloading zone, thus defining, from the unloading zone to the loading zone, the reduction in the fume transit section and the increase in the volume of the collector.

In this way, it is obtained that the transit section of the fumes arriving from the melting furnace is greater where the flow rate of the fumes is greater, while it is lower where the flow rate of the fumes is lower.

Compared with conventional solutions where the conveyor has a constant cross section, this solution allows to reduce the overall sizes of the conveyor, whose lateral delimitation walls can have smaller sizes. Consequently, the advantage is obtained of being able to reduce the quantity of cooling water circulating in the apparatus, needed to cool the walls, which also allows to proportionally reduce the overall weight of the conveyor, and consequently of the whole apparatus.

According to some aspects of the present invention, the support wall comprises a plurality of segments following each other along the longitudinal development of the containing structure and lying on planes vertically offset with respect to each other, in which each of the through apertures is interposed between two consecutive segments.

In this way we obtain a stepped shape of the support wall, which allows an advantageous management of the positioning of the through apertures and the suction of the fumes through them.

According to variant forms, the support wall is divided into segments lying on respective parallel or substantially parallel planes, alternated with through apertures and defining a surface of the support wall essentially continuous and inclined downward and toward the container.

The present invention also concerns a method to move and preheat metal material to be fed to a container, which provides first of all to prepare an apparatus to move and preheat the material comprising a containing structure provided with an internal compartment. The method also comprises moving the material in a direction of feed on a support wall of a conveyor inside the internal compartment, and sucking in hot fumes from one end of the containing structure opposite to the position of the container.

This suction determines, along the longitudinal development of the containing structure, a stream of the fumes in counterflow with respect to the direction of feed, and through the material from the conveyor to a collector inside the internal compartment and located below the conveyor. The fumes pass from the conveyor to the collector through through apertures made in the support wall and connecting the conveyor fluidically to the collector. Moreover, the suction of the hot fumes provides to put the material into contact with a decreasing stream of hot fumes as it is distanced from the container.

BRIEF DESCRIPTION OF THE DRAWINGS

These and other characteristics of the present invention will become apparent from the following description of some forms of embodiment, given as a non-restrictive example with reference to the attached drawings wherein:

FIG. 1 is a schematic lateral view in section of an apparatus to move and preheat metal material for a melting furnace according to some forms of embodiment of the invention;

FIGS. 2a-2c are front views in section of the apparatus according to respective section lines A-A, B-B and C-C in FIG. 1;

FIGS. 3a-3d show forms of embodiment in detail of an enlarged detail of FIG. 1.

In the following description, the same reference numbers indicate identical parts of the apparatus to move and preheat metal material according to the present invention, also in different forms of embodiment. It is understood that elements and characteristics of one form of embodiment can be conveniently incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawings. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

FIG. 1 is used to describe forms of embodiment of an apparatus 10 to move and preheat metal material M, in particular metal material M for metallurgical melting processes.

The metal material M can be melted during the melting processes in a melting furnace 11 of a known type and therefore not described in detail in the present description, but only in its components functional to the apparatus 10.

The melting furnace 11, which in the forms of embodiment shown in FIG. 1 is, merely by way of example, an electric furnace, can include a shell 12 inside which the melting processes take place, and a fume discharge pipe 13, integrated with the shell 12, configured to discharge the hot fumes F produced by melting outside the shell 12.

The apparatus 10 can be configured to convey the metal material M directly toward the shell 12 of the melting furnace 11, for example continuously, or toward a temporary storage basket, for example in the event of a discontinuous or batched charge of the melting furnace 11.

In general the apparatus 10 moves the metal material M and conveys it toward a container used for the subsequent steps in the melting process, which can be melting proper, or storage and transfer to the melting place. In some forms of embodiment, between the apparatus 10 and the melting, storage or transfer container, there can be a connecting car, indicated by the reference number 33, which receives the material from the apparatus 10 and unloads it into the container, possibly moving and/or protruding inside it during the unloading step.

The apparatus 10 includes a containing structure 14, of the box-like type, defined by an upper wall 15, a base wall 16 and two lateral walls 17, reciprocally opposite and connected to the upper wall 15 and the base wall 16.

The upper wall 15 can rest on or be attached to the lateral walls 17.

The containing structure 14, which connects at the front to the fume discharge pipe 13, has an oblong shape with a substantially horizontal longitudinal development, and which can even be several dozen meters long.

The apparatus 10 can include a sealing device 113, configured to guarantee the fume seal in correspondence with the joint between the fume discharge pipe 13 and the containing structure 14, reciprocally mobile.

FIGS. 3a-3d are used to describe, merely by way of example, possible forms of embodiment of the sealing device 113, in which first sealing members 113a are connected to the fixed fume discharge pipe 13, and second sealing members 113b are connected to the mobile containing structure 14.

In possible solutions, the first 113a and second 113b sealing members can be put in reciprocal contact to define the seal of the joint between the fume discharge pipe 13 and the containing structure 14, in a single seal (FIGS. 3a and 3b), or a double seal (FIG. 3c), for example of the sliding, flexible or concertina type.

Other solutions can provide that the first 113a and second 113b sealing members are immersed inside a container 113c in a liquid, for example water, through which the fumes do not pass (FIG. 3d).

FIGS. 1 to 2c are used to describe forms of embodiment in which the upper wall 15, the base wall 16 and lateral walls 17 delimit an internal compartment 14a, in which the material M is contained and also a stream of hot fumes F is defined through the material M in order to heat it.

The containing structure 14 is provided with a loading zone 14c, in correspondence with which the material M is loaded inside the internal compartment 14a, and an unloading zone 14s in correspondence with which the material M is unloaded into the intended container.

In an intermediate position between the base wall 16 and the upper wall 15, the containing structure 14 includes a support wall 18 on which the material M rests.

Along the containing structure 14, to promote the constant charge of the container located downstream of the unloading zone 14s, in this case the shell 12, the material M is kept at a constant height on the support wall 18.

In some forms of embodiment, described by way of example with reference to FIG. 1, the apparatus 10 includes movement means (not shown), connected to the containing structure 14, and configured to move the containing structure 14, for example subjecting it to vibrations and/or oscillations. The vibrations and/or oscillations cause the material M to advance from the loading zone 14c to the unloading zone 14s in a direction of feed shown by way of example in FIG. 1 by the arrow Am.

At the end of the containing structure 14, remote from the melting furnace, there can be a dynamic sealing element 19, which prevents the entrance of air from the loading zone inside the zone where the metal material M is conveyed. The dynamic sealing element 19 can consist for example of a roller, with a conventional, or conical, or crescent shape, or other suitable shape, or by an equivalent system with a sealing function. The dynamic sealing element 19 also performs a mechanical pressing on the metal material M entering the containing structure 14, flattening it and leveling it.

The presence of the dynamic sealing element 19 therefore allows to have a defined and constant volume of metal material M being fed, uniformly pressed, thus reducing to a minimum any empty spaces.

In this way, thanks to the greater density of the metal material M in the feed channel, the efficiency of heat exchange between the hot fumes exiting from the furnace 11 and the material itself is considerably increased, determining a higher heating effect of the fumes.

The presence of the dynamic sealing element 19 at the end of the containing structure 14 opposite the one coupled with the furnace 11 also reduces the entry of "false air" arriving from outside, which leaks into the inevitable spaces that are created with the introduction of the metal material M into the structure 14.

A seal is also achieved against the possible entry of "false air" with the aid of an element, for example a suction pipe 30, that sucks up the air that has entered due to the interspaces between the metal material and the dynamic sealing element 19, and also the fumes which, from the melting furnace 11, reach the loading zone of the conveyor.

The combined presence of the dynamic sealing element 19 and the suction pipe 30 allows to reduce to a minimum the introduction of air at low temperature into the channel used for heating the metal material M.

Furthermore, the dynamic sealing element 19 also performs the function, thanks to its pressing and leveling action on the metal material, of creating a stopper that causes a depression in the suction pipe.

As a consequence, the hot fumes coming from the furnace are taken in thanks to the action of the suction unit 23, passing through the metal material M.

The absence of the dynamic sealing element 19 would cause an at least partial exit of the fumes directly from the roof of the furnace, and would not allow to heat the metal material M effectively.

The support wall 18 is divided into a plurality of segments which, in FIG. 1, are indicated with specific references, progressing alphabetically from the loading zone 14c to the unloading zone 14s, and which will be identified in the present description with a generic reference number 18n.

The segments 18n can be defined by plates disposed consecutively in succession along a longitudinal development of the containing structure 14 from the loading zone 14c to the unloading zone 14s.

The segments 18n define a development declining of the support wall 18 from the loading zone 14c to the unloading zone 14s, that is, they define a difference in level between the end of the support wall 18 in correspondence with the loading zone 14c and the opposite end, in correspondence with the unloading zone 14s.

The declining development can be continuous or discontinuous.

FIG. 1 shows, by way of example, nine segments 18n, that is, a first segment 18a, positioned in correspondence with the loading zone 14c, a second segment 18b, in a more inner position in the internal compartment 14a, and similarly a third 18c, a fourth 18d, a fifth 18e, a sixth 18f, a seventh 18g, an eighth 18h, up to a ninth segment or terminal segment 18i, positioned in correspondence with the unloading zone 14s of the containing structure 14.

In possible solutions, the terminal segment 18i can be positioned above the base wall 16 of the containing structure 14.

In other solutions, the terminal segment 18i can coincide with a tract of the base wall 16 comprised between the segment 18n preceding the terminal segment 18i and the terminal end of the base wall 16.

In some solutions, the support wall 18 divides the containing structure 14, inside the internal compartment 14a, into two overlapping parts, defining respectively a conveyor 20 for the material M and a collector 22 for the hot fumes F.

In some forms of embodiment, described by way of example with reference to FIGS. 1-2c, the conveyor 20 is delimited by the upper wall 15, the lateral walls 17, only one of which is partly visible in FIG. 1, and by the support wall 18.

In possible implementations of the present invention, the lateral walls 17, the base wall 16 and the support wall 18 delimit the collector 22.

According to some solutions, the collector 22 can be positioned below the conveyor 20.

In some forms of embodiment, the lateral walls 17 of the conveyor 20 can be perpendicular to the support wall 18, or inclined with respect thereto.

During use, that is, during normal functioning of the apparatus 10, the lateral walls 17, the upper wall 15 and the material M present on the support wall 18 delimit a fume transit section 21.

The internal compartment 14a is connected fluidically to the fume discharge pipe 13, the function of which is to allow the introduction of the hot fumes F into the internal compartment 14a, in particular into the fume transit section 21.

FIG. 1 is used to describe forms of embodiment in which the support wall 18 comprises one or more through apertures, or suction apertures, which are indicated in FIG. 1 with specific references, progressing alphabetically, and which in the present description are also identified with a generic reference number 118n.

Each suction aperture 118n is interposed between two adjacent segments 18n and puts the conveyor 20 and the fume transit section 21 into fluidic communication with the collector 22.

Each suction aperture 118n extends transversely at least for most of the distance that separates the two lateral walls 17 of the containing structure 14.

In possible implementations, adjacent segments 18n can partly overlap in correspondence with the corresponding aperture 118n.

There are eight suction apertures 118n in the specific case shown in FIG. 1, and they include a first suction aperture 118a, interposed between the first segment 18a and the second segment 18b, a second suction aperture 118b, interposed between the second segment 18b and the third segment 18c, and in the same way a third 118c, fourth 118d, fifth 118e, sixth 118f, seventh 118g and eighth suction aperture or terminal suction aperture 118h, interposed between the terminal segment 18i and an eighth segment 18h, previous to it.

FIG. 1 is used to describe forms of embodiment in which the segments 18a-18i that make up the support wall 18 can lie on vertically offset planes, to define a development thereof of the stepped type. With reference to this analogy, each segment 18n can be understood as the support plane of one step and each suction aperture 118n as the riser of said step.

According to possible forms of embodiment, the segments 18a-18i are parallel to each other, that is, they lie on parallel planes.

In other forms of embodiment, the segments 18a-18i are disposed on substantially parallel planes, defining an inclined and continuous surface of the support wall 18.

Other variants can provide that the segments 18a-18i are inclined with respect to each other.

In some forms of embodiment, the segments 18a-18i can be disposed horizontal, or inclined with respect to the horizontal direction.

Solutions can be provided in which the segments 18a-18i are inclined with respect to the horizontal direction according to an inclination such that a first end portion nearest the loading zone 14c is raised with respect to an end portion opposite said first portion and nearer to the unloading zone 14s.

In possible solutions, the segments 18a-18i are parallel to the base wall 16, which can be parallel or inclined with respect to the horizontal direction.

It is understood that all the forms of embodiment, solutions and variants described here can be combined with each other in any technically possible combination.

The apparatus 10 can include a suction unit 23, in fluidic communication with the collector 22 at one end of the containing structure 14 corresponding to the loading zone 14c, that is, at the opposite end to the position of the shell 12 and configured to create a depression in the collector 22 and consequently determine the entry of the hot fumes F into the fume transit section 21, and the exit of the hot fumes F from the collector 22.

It is also possible to provide a bypass, consisting of a suction pipe 32 located along the conveyor 20, in this case associated with its upper wall 15, and normally closed by a shutter valve. The suction pipe 32 is opened in an emergency, for example when the suction unit 23 is not sufficient due to a greater density of the scrap, or for other problems.

The stream of hot fumes F inside the containing structure 14 therefore flows from a zone of the fume transit section 21 in correspondence with the unloading zone 14s toward a part of the collector 22 located in correspondence with the loading zone 14c, where the suction unit 23 is positioned.

The hot fumes F therefore flow in the opposite direction to the direction of feed Am of the material M along the conveyor 20, that is, in counterflow with respect to the material M.

Since the conveyor 20 and collector 22 overlap, the hot fumes F are obliged to flow through the material M.

In this way, the hot fumes F flow through the material M from the top downward, so that the whole volume of material M is affected by the passage of the hot fumes F. Since they are at a temperature in the range of 1,000° C.-1,400° C., they heat the entire mass of material M, in a uniform manner, preventing heat stratifications.

In a possible variant, the position of the suction unit 23 below the conveyor 20 allows to reduce the transverse bulk of the apparatus 10 compared with known solutions, in which suction normally occurs laterally through the lateral walls of the conveyor.

FIGS. 1-2c are used to describe forms of embodiment in which the fume transit section 21 has a transverse extension, and hence volume, decreasing along the containing structure 14 from the unloading zone 14s to the loading zone 14c, that is, away from the shell 12.

Vice versa, the cross section and hence the volume of the collector 22 decreases from the loading zone 14c to the unloading zone 14s. In particular, the volume of the collector 22 increases in a manner correlated to the reduction in volume of the fume transit section 21.

FIGS. 2a-2c are used to describe simplified forms of embodiment in which the lateral walls 17 are orthogonal to the base wall 16 and the support wall 18, and therefore the comparison between the volumes of the material M, the fume transit section 21 and the collector 22, and the respective cross sections along the containing structure 14, can be made considering only the corresponding heights.

In the case shown in FIGS. 2a-2c, Hm indicates the height of the material M, H1 indicates the height of the fume transit section 21, and H2 the height of the collector 22.

In particular, height Hm remains unchanged between sections A-A, B-B, C-C.

Given the same width of the conveyor 20, FIGS. 2a-2c show that the height H1 increases from section A-A to section B-B and from section B-B to section C-C.

This leads to a reduction in the passage volume of the hot fumes F inside the fume transit section 21 as gradually a part of them is sucked in by the suction unit 23 and, passing through the material M and the suction apertures 118n in succession from the unloading zone 14s to the loading zone 14c, flows into the collector 22.

Consequently, the passage section of the material M and the hot fumes F, that is, the cross section of the conveyor 20, which essentially depends on the sum of the heights Hm and H1, is greater where the flow rate of the hot fumes F is greater, that is, near the unloading section 14s, which represents the entrance part of the hot fumes F into the fume transit section 21, and also the portion of the containing structure 14 nearest the melting furnace 11.

The passage or cross section of the conveyor 20 is smaller, instead, where the flow rate of the hot fumes F is smaller, that is, near the loading section 14a, which represents the terminal part of the stream of the hot fumes F.

Compared with conventional solutions in which the conveyor 20 has a constant cross section, this solution allows to reduce the overall sizes of the conveyor 20 itself, whose lateral delimitation walls, which in this case are portions of the lateral walls 17 of the containing structure 14, can have smaller sizes. The configuration of the containing structure 14 as described above can allow to obtain a reduction in size of the delimitation walls of the conveyor 20 by as much as 30% and more.

This gives the advantage of being able to reduce the delivery of water for cooling the walls, which also allows to proportionally reduce the overall weight of the conveyor 20, and consequently of the whole apparatus 10.

Furthermore, thanks also to this reduction in weight, it can be provided that the upper wall 15 of the containing structure 14 is attached to the lateral walls 17 of the same, so as to obtain a closed structure, more resistant and without sealing means interposed between the upper wall 15 and the lateral walls 17, sealing means which are normally used in the state of the art.

According to some forms of embodiment described with reference to the attached drawings, the cross section and hence the volume of the collector 22 increases in a complementary manner with respect to the fume transit section 21, so that the flow of hot fumes F transiting in the fume transit section 21 and through the suction apertures 118n increases in an inverse sense with respect to the direction of feed of the material Am.

This solution allows to keep the temperature of the hot fumes F high along the whole fume transit section 21, as the hot fumes F gradually move from the unloading zone 14s to the loading zone 14c.

The fact that the flow of hot fumes F in contact with the material M decreases along the fume transit section 21, and that the volume thereof decreases from the unloading zone 14s to the loading zone 14c, allows to keep the speed of the hot fumes F substantially constant.

In some forms of embodiment of the present invention, the containing structure 14 as described above allows to prevent the hot fumes F from mixing with air at ambient temperature, allowing them to keep their temperature longer and an energy content high enough to heat the material M along the whole conveyor 20.

It is clear that modifications and/or additions of parts may be made to the apparatus 10 as described heretofore, without departing from the field and scope of the present invention.

It is also clear that, although the present invention has been described with reference to some specific examples, a person of skill in the art shall certainly be able to achieve many other equivalent forms of apparatus for to move and preheat metal material, having the characteristics as set forth in the claims and hence all coming within the field of protection defined thereby.

The invention claimed is:

1. An apparatus to move and preheat metal material to be fed to a container, the apparatus comprising:
a horizontal containing structure including:
an upper wall, a base wall, and lateral walls defining an internal compartment, the horizontal containing structure having a first end configured to be associated with said container and a second end opposite of the first end,
a support wall interposed between said upper wall and said base wall, the support wall including one or more through apertures,
a conveyor for said metal material, the conveyor defined by said support wall, said lateral walls, said upper wall, and said base wall,
a fume transit section defined between said upper wall and said metal material when conveyed by the conveyor, and
a collector for hot fumes, the collector located below said conveyor inside said internal compartment along an entire longitudinal development of said horizontal containing structure, the one or more through apertures fluidly connecting said conveyor and said collector, wherein said fume transit section has a volume that reduces as said fume transit section is distanced from said container along the longitudinal development of said horizontal containing structure, and said collector has a volume that increases in a manner correlated to said reduction in the volume of the fume transit section;
a dynamic sealing element in correspondence with the second end of said horizontal containing structure, a portion of the dynamic sealing element is located above a part of the upper wall of the horizontal containing structure to which the dynamic sealing element is attached, and the dynamic sealing element configured to prevent air from entering a zone of the internal compartment where said metal material is conveyed and to press and level said metal material entering the horizontal containing structure;
a suction unit connected to said collector and in a position below said conveyor at the second end of said containing structure, the suction unit configured to take in said hot fumes through said one or more through apertures and through said collector; and
a suction pipe at the second end of said containing structure for sucking up air that has entered due to interspaces between the metal material and said dynamic sealing element and the hot fumes from the container that reach a loading zone of the conveyor.

2. The apparatus of claim 1, wherein said horizontal containing structure includes the loading zone for loading said metal material into said internal compartment and an unloading zone for unloading said metal material into said container, and
wherein said support wall has a development declining from said loading zone to said unloading zone, in order to define, from the unloading zone to the loading zone, said reduction in the volume of the fume transit section and said increase in the volume of the collector.

3. The apparatus of claim 2, wherein said support wall includes a plurality of segments following each other along the longitudinal development of the horizontal containing structure and lying on planes vertically offset with respect to each other, each of said one or more through apertures being interposed between two of the plurality of segments that are consecutive.

4. The apparatus of claim 2, wherein said support wall includes a plurality of segments following each other along the longitudinal development of the horizontal containing structure to define a continuous surface inclined downward and toward said container, each of said one or more through apertures being interposed between two of the plurality of segments that are consecutive.

5. The apparatus of claim 2, wherein
the suction pipe is fluidly connected to said loading zone and cooperating with said dynamic sealing element to prevent the air from outside the horizontal containing structure from entering past the loading zone.

6. The apparatus of claim 1, wherein said dynamic sealing element is a roller with a circular, conical, or crescent shape.

7. A method to move and preheat metal material to be fed to a container using an apparatus that includes a containing structure provided with an internal compartment, the method comprising:
moving said metal material along a direction of feed on a support wall of a conveyor inside said internal compartment;
sucking in hot fumes from an end of said containing structure that is opposite to a position of said container with a suction unit so as to provide, along a longitudinal development of said containing structure, a stream of said hot fumes that flows in counterflow with respect to said direction of feed, the stream of said hot fumes flowing through said metal material on the conveyor, through apertures in said support wall to a collector inside said internal compartment located below said conveyor, and from the collector to the suction unit in a position below said conveyor at said end of said containing structure opposite to the position of said container, said apertures in said support wall fluidly connecting said conveyor and said collector, wherein the suction of said hot fumes is configured to put said metal material into contact with a decreasing stream of the hot fumes as a distance between said metal material and said container increases;
providing a dynamic sealing element in correspondence with said end of said containing structure opposite to the position of said container, a portion of the dynamic sealing element is located above a part of an upper wall of the containing structure to which the dynamic sealing element is attached, and the dynamic sealing element is configured to mechanically press on said metal material; and
providing a suction pipe at said end of said containing structure opposite to the position of said container, the suction pipe sucking up air that has entered due to interspaces between the metal material and said dynamic sealing element and hot fumes from the container that reach a loading zone of the conveyor.

8. The method of claim 7, wherein the suction of said hot fumes is configured so as to maintain constant a speed of said hot fumes in transit inside said conveyor in contact with said metal material and in counterflow to said direction of feed.

9. The apparatus of claim 1, wherein the base wall extends parallel to a horizontal plane from the first end to the second end of the horizontal containing structure.

10. The apparatus of claim 1, wherein a longitudinal axis of the horizontal containing structure is parallel to a horizontal plane.

11. The method of claim 7, wherein the containing structure includes the upper wall, a base wall, and lateral walls that define the internal compartment, the base wall extending parallel to a horizontal plane from said end of the containing structure opposite to the position of said container to a second end opposite said end.

\* \* \* \* \*